United States Patent
Edic et al.

(10) Patent No.: US 6,879,715 B2
(45) Date of Patent: Apr. 12, 2005

(54) ITERATIVE X-RAY SCATTER CORRECTION METHOD AND APPARATUS

(75) Inventors: Peter Michael Edic, Albany, NY (US); Armin Horst Pfoh, Niskayuna, NY (US); Shankar Visvanathan Guru, Brookfield, WI (US)

(73) Assignee: General Electric Company, Niskayuna, NY (US)

( * ) Notice: Subject to any disclaimer, the term of this patent is extended or adjusted under 35 U.S.C. 154(b) by 691 days.

(21) Appl. No.: 09/683,255

(22) Filed: Dec. 5, 2001

(65) Prior Publication Data

US 2003/0103666 A1 Jun. 5, 2003

(51) Int. Cl.[7] .............................................. G06K 9/00
(52) U.S. Cl. ..................................................... 382/132
(58) Field of Search ................................ 382/128, 131, 382/132, 154, 260, 264, 274; 378/7, 98.4; 250/370.09, 370.02, 370.15; 702/40

(56) References Cited

U.S. PATENT DOCUMENTS

| | | | | |
|---|---|---|---|---|
| 4,823,370 A | * | 4/1989 | Kikuchi | 378/98.4 |
| 4,918,713 A | * | 4/1990 | Honda | 378/98.4 |
| 5,666,391 A | * | 9/1997 | Ohnesorge et al. | 378/7 |
| 6,018,565 A | * | 1/2000 | Ergun et al. | 378/95 |
| 6,052,433 A | * | 4/2000 | Chao | 378/98.9 |
| 6,134,297 A | * | 10/2000 | Chao | 378/98.12 |
| 6,163,589 A | | 12/2000 | Vartanian | 378/7 |
| 6,256,367 B1 | | 7/2001 | Vartanian | 378/7 |

* cited by examiner

*Primary Examiner*—Andrew W. Johns
*Assistant Examiner*—Shervin Nakhjavan
(74) *Attorney, Agent, or Firm*—Penny A. Clarke; Patrick K. Patnode

(57) ABSTRACT

An apparatus and a method of processing a collection of uncorrected radiographs are described with the apparatus comprising an X-ray scatter compensator and a controller. The compensator is configured for iteratively generating a refined value of a normalized estimated X-ray scatter signal corresponding to an uncorrected radiograph of said collection of uncorrected radiographs. The controller is configured to be coupled to the compensator and further configured to subtract said refined value of said normalized estimated X-ray scatter signal from a corresponding normalized total X-ray signal of a respective one of said uncorrected radiographs so as to form a corresponding corrected radiograph.

36 Claims, 3 Drawing Sheets

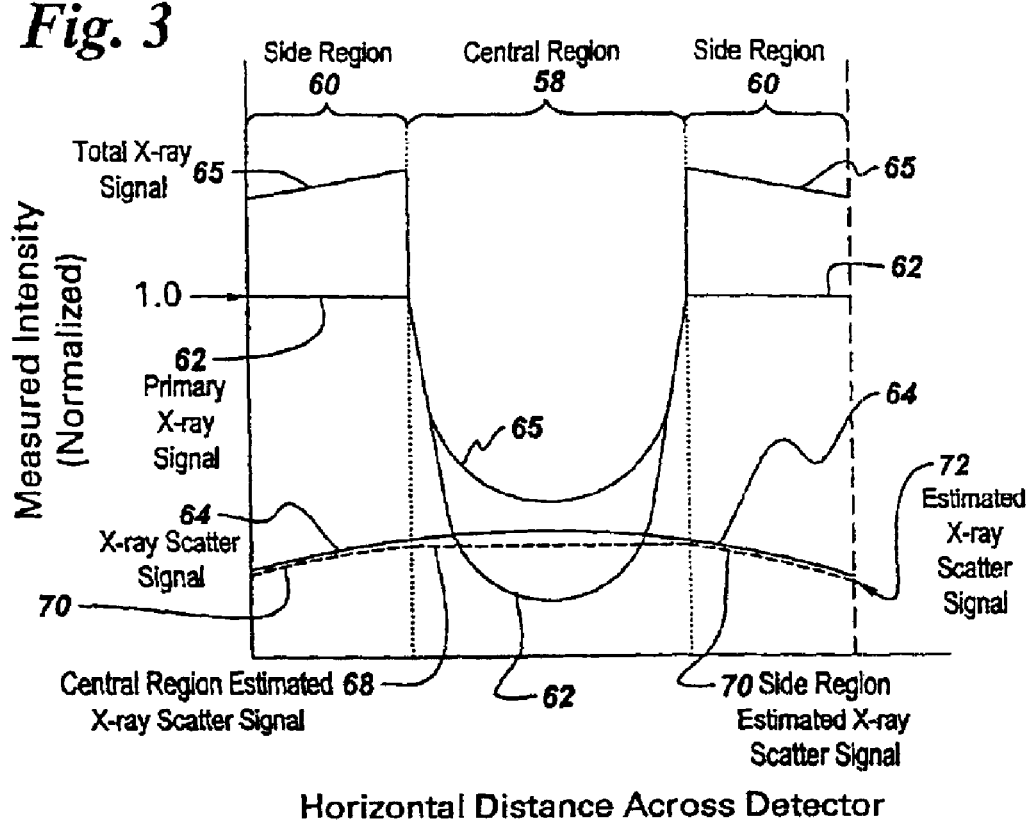
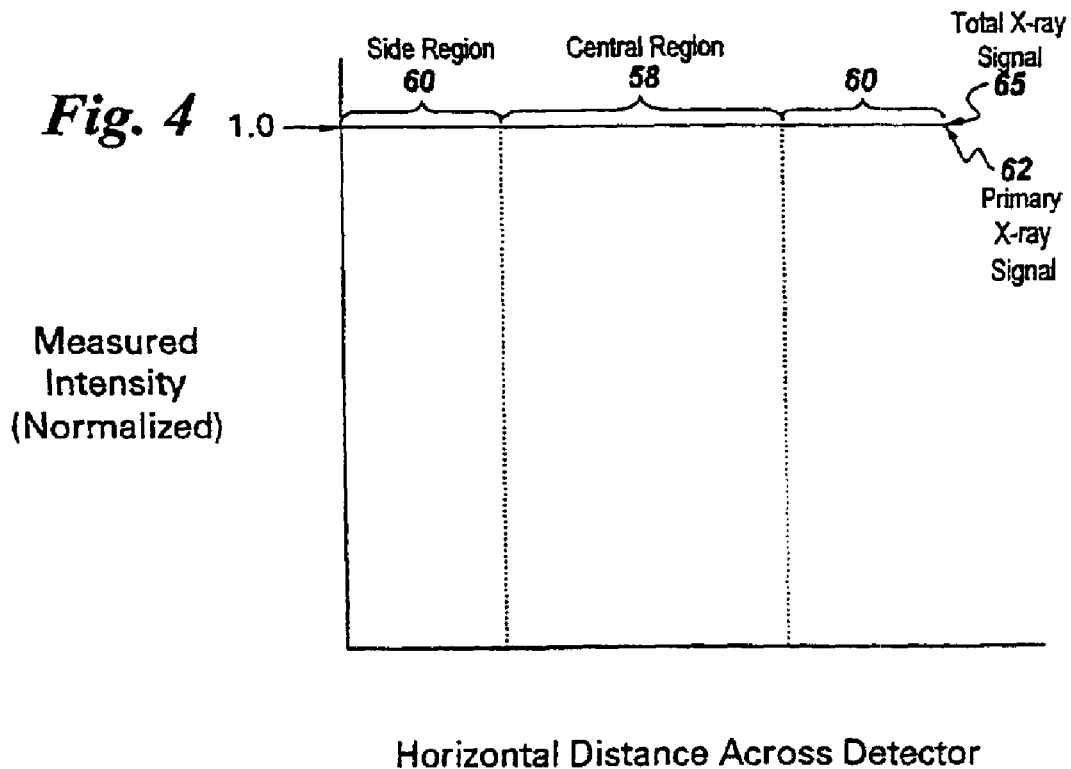

ITERATIVE X-RAY SCATTER CORRECTION METHOD AND APPARATUS

FEDERAL RESEARCH STATEMENT

This invention was made with Government support under Government Contract No. 70NANB5H1148, which was awarded by the National Institute of Standards and Technology. The Government may have certain rights in this invention.

BACKGROUND OF THE INVENTION

The field of the invention relates to X-ray computed tomography (CT) and more particularly to computed tomography of manufactured parts.

In computed tomography a radiographic source (e.g., X-ray) typically is positioned on a first side of an object and a radiographic (e.g., X-ray) detector is positioned on a second, opposing side of the object. X-rays originating from the radiographic source pass through the object and are detected in the X-ray detector. Relative motion is generated between the object and the radiographic X-ray source and X-ray detector, such that radiographic image data is collected at a plurality of relative positions with the object. The radiographic X-ray source and X-ray detector may also be moved relative to the axis of the object as well as around the object. In some industrial applications the X-ray source and X-ray detector are commonly held stationary and the object is rotated and translated to provide the plurality of relative positions. In some other industrial applications the X-ray source and X-ray detector are commonly held stationary and the object is rotated or translated to provide the plurality of relative positions.

Often the radiographic X-ray detector is made up of a number of X-ray detectors aligned in a two-dimensional array. The use of a two-dimensional array of X-ray detectors allows for a separate two-dimensional radiographic image to be collected at each step of rotation and translation of the object relative to the source and the detector. Alternatively, the use of a two-dimensional array of X-ray detectors allows for a separate two-dimensional radiographic image to be collected at each step of rotation or translation of the object relative to the source and the detector.

The intensity of X-rays passing through an object is related to the integral of the object"s linear attenuation coefficient along the path of the X-ray. Where the object contains defects or other non-uniformities, the flux density of the X-rays passing through the object will vary with the physical linear attenuation coefficient of the non-uniformity.

A number of digital radiographs are collected during rotation and translation of the object relative to the X-ray detector and radiographic X-ray source. Alternatively, a number of digital radiographs are collected during rotation or translation of the object relative to the X-ray detector and radiographic X-ray source. The digital radiographic data from these images is processed and a three-dimensional image is reconstructed to facilitate location of defects and non-uniformities in a three-dimensional representation of the object. One approach for image reconstruction involves solving a matrix of equations; a value of the linear attenuation coefficient for each point may be determined in three-dimensional space using the so-called Algebraic Reconstruction Technique (ART). Alternatively, a filtered backprojection technique may be used where digital radiographic data is preprocessed, filtered, and then back-projected into three-dimensional space to generate a three-dimensional reconstruction of the linear attenuation coefficients within the object.

With knowledge of each point"s linear attenuation coefficient in three-dimensional space, images are created from such linear attenuation coefficients. The object is figuratively sliced (e.g., a plane may be formed through the object) and an image of the slice is created using the linear attenuation coefficient at each point on the slice as pixel values of the image.

While tomographic images can be useful, the images may have artifacts resulting from the configuration of the imaging geometry. For example, X-ray flux that traverses the object is composed of two components: a primary X-ray signal and a scattered X-ray signal. The primary X-ray signal results from X-rays that do not interact with the object. The scattered X-ray signal results from X-rays that interact with the object and are redirected (i.e., scattered).

Some of the scattered X-rays may be directed away from the X-ray detector, or the surrounding material may absorb the scattered X-rays. Other scattered X-rays may reach and be detected in the X-ray detector at a variety of angles. In X-ray computed tomography, detection of only the primary X-ray signal is desired. The scattered X-ray signal is known to reduce resolution and contrast in reconstructed images.

The conventional solution to reduce the scattered X-ray signal involves the use of physical collimators. However, physical collimators are commonly most effective in one-dimensional (linear) X-ray detectors where the X-ray detector elements are relatively large, such that stationary collimators are feasible. Multi-row X-ray detectors also use physical collimators; the dimensions of individual X-ray detector elements are still relatively large to make collimation of the primary X-ray signal feasible.

Where area X-ray detectors (i.e., two-dimensional X-ray detectors) are used, the physical dimension of the individual X-ray detector elements may be an order of magnitude less than those used in linear X-ray detectors. Hence, it is not typically feasible to collimate every X-ray detector element of the area X-ray detector, as is usually done with linear or multi-row X-ray detectors. As a result, the scattered X-ray component detected by the area X-ray detector is significantly larger than the scattered X-ray component detected by the linear X-ray detector. Therefore, a need exists for a means for reducing the scattered X-ray signal.

SUMMARY OF THE INVENTION

Embodiments of the present invention include an apparatus and a method of processing a collection of uncorrected radiographs. In one embodiment, the apparatus comprises an X-ray scatter compensator and a controller. The compensator is configured for iteratively generating a refined value of a normalized estimated X-ray scatter signal corresponding to an uncorrected radiograph of the collection of uncorrected radiographs. The controller is configured to be coupled to the compensator and further configured to subtract the refined value of the normalized estimated X-ray scatter signal from a corresponding normalized total X-ray signal of a respective one of the uncorrected radiographs so as to form a corresponding corrected radiograph.

BRIEF DESCRIPTION OF THE DRAWINGS

These and other features, aspects, and advantages of the present invention will become better understood when the following detailed description is read with reference to the accompanying drawings in which like characters represent like parts throughout the drawings, herein:

FIG. 3 depicts a detected level of X-rays across the X-ray detector when irradiating an object as depicted in FIG. 2.

FIG. 4 depicts a detected level of X-rays across the X-ray detector without any object in the path of the X-rays (i.e. an air image radiograph).

DETAILED DESCRIPTION

Figure 1:
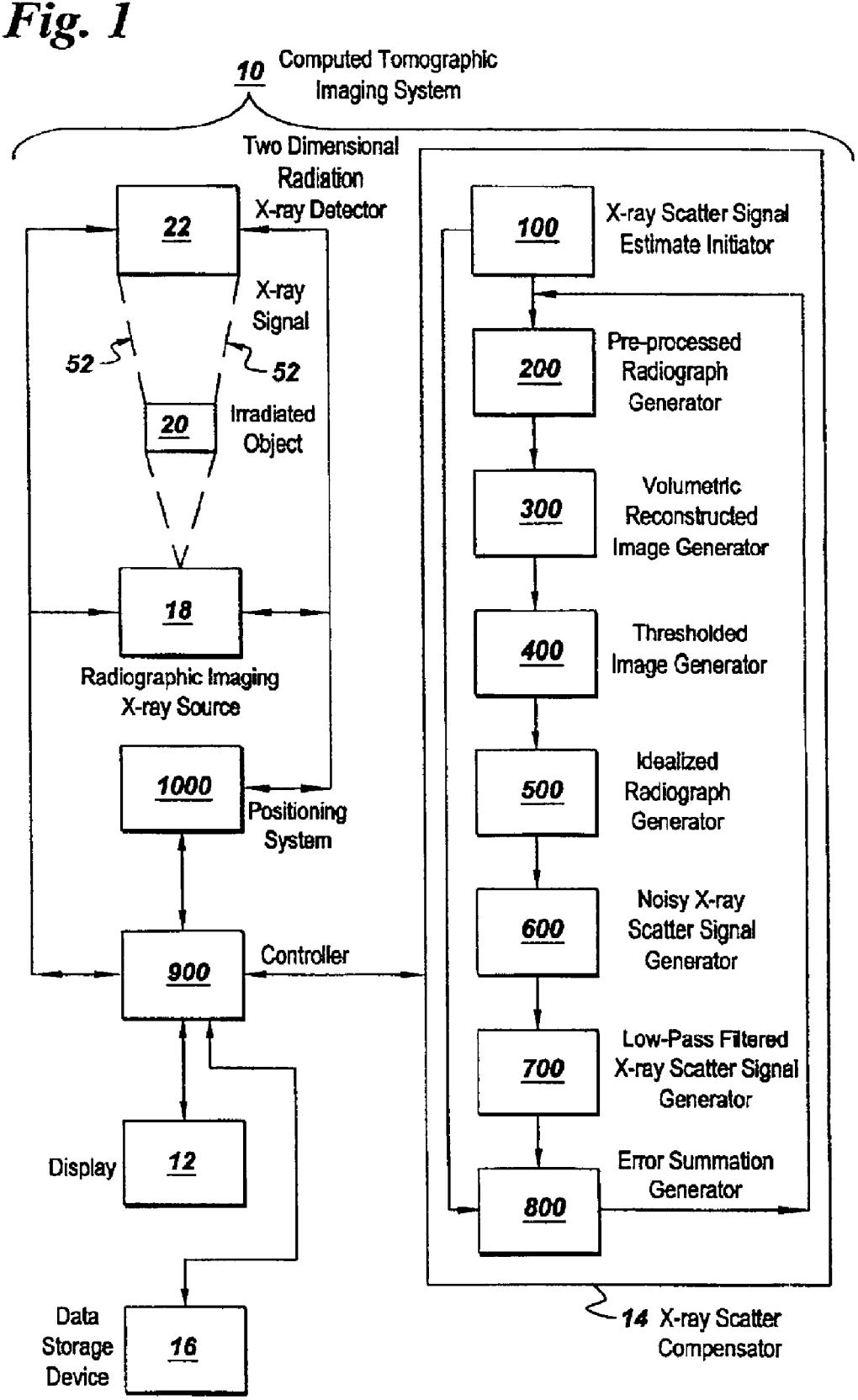
FIG. 1 depicts a block diagram of a computed tomography imaging system in accordance with an embodiment of the invention.

In one embodiment of the present invention, an apparatus for processing an uncorrected radiograph comprises an X-ray scatter compensator 14 and a controller 900 as shown in FIG. 1. The compensator 14 is configured for iteratively generating a refined value of a normalized estimated X-ray scatter signal 72 of FIG. 3 corresponding to an uncorrected radiograph. The controller 900 of FIG. 1 is configured to be coupled to the compensator 14. The controller 900 is further configured to subtract the refined value of the normalized estimated X-ray scatter signal 72 of FIG. 3 from a corresponding normalized total X-ray signal 65 of the uncorrected radiograph so as to form a corresponding corrected radiograph.

In another embodiment of the present invention, the uncorrected radiograph has a plurality of profiles, where each of the profiles of the uncorrected radiograph has a corresponding normalized total X-ray signal 65. The compensator 14 is further configured for iteratively generating a plurality of refined values of the normalized estimated X-ray scatter signal 72, where each of the plurality of refined values corresponds to a respective portion of the uncorrected radiograph. The controller 900 of FIG. 1 is additionally configured to subtract each of the plurality of refined values from a respective one of the plurality of normalized total X-ray signals 65 of FIG. 3 so as to form the corresponding corrected radiograph.

In another embodiment of the present invention, each of the uncorrected radiographs in a collection of uncorrected radiographs has a (meaning at least one) corresponding profile where each profile of each of the uncorrected radiographs has a corresponding normalized total X-ray signal 65. The compensator 14 of FIG. 1 is further configured for iteratively generating the refined value of the normalized estimated X-ray scatter signal 72 of FIG. 3 corresponding to each of the profiles for each of the uncorrected radiographs in the collection of uncorrected radiographs. The controller 900 of FIG. 1 is further configured to subtract the refined value from a corresponding normalized total X-ray signal 65 of FIG. 3 of the profile in each of the uncorrected radiographs so as to form a collection of corrected radiographs. The controller 900 of FIG. 1 is further configured for constructing an object representation from the collection of corrected radiographs.

In another embodiment of the present invention, each of the uncorrected radiographs in a collection of uncorrected radiographs has a plurality of profiles, where each of the profiles of each one of the uncorrected radiographs has a corresponding normalized total X-ray signal 65 of FIG. 3. The compensator 14 of FIG. 1 is further configured for iteratively generating the refined value of the normalized estimated X-ray scatter signal 72 of FIG. 3 corresponding to each of the profiles for each one of the uncorrected radiographs in the collection of uncorrected radiographs. The controller 900 of FIG. 1 is further configured to subtract the refined value from a corresponding normalized total X-ray signal 65 of FIG. 3 for each of profiles in each one of the uncorrected radiographs so as to form a collection of corrected radiographs. The controller 900 of FIG. 1 is further configured for constructing an object representation from the collection of corrected radiographs.

A block diagram of a computed tomography imaging system 10 in accordance with an illustrated embodiment of the present invention is provided as FIG. 1. The computed tomography imaging system 10 includes the compensator 14 coupled to a controller 900. The controller 900 is coupled to a data storage device 16, a display a radiographic imaging X-ray source (e.g., an X-ray tube) 18, a two-dimensional radiation X-ray detector 22 and a positioning system 1000. The X-ray detector 22 is used for detecting an X-ray signal 52 of FIG. 2 from the X-ray source 18 of FIG. 1. Although the X-ray detector 22 is considered to be two-dimensional, a one-dimensional X-ray detector can be used in the context of the invention. In another embodiment of the present invention, a plurality of X-ray detectors (either one-dimensional detectors or two-dimensional detectors) are configured around the circumference of a cylinder and are stationary, while the X-ray source 18 rotates, so as to irradiate the object 20.

Figure 2:
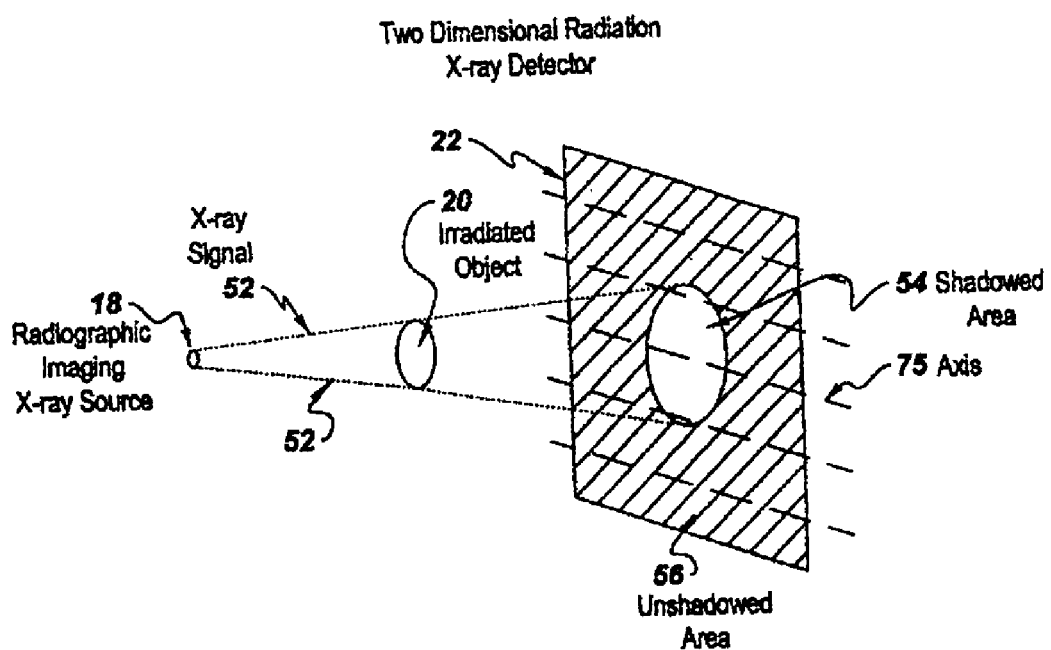
FIG. 2 depicts a simplified model of object detection by the system of FIG. 1.

The following discussion provides additional details regarding refining the normalized estimated X-ray scatter signal 72 of FIG. 3 for the measured incident radiation intensity along an axis 75 of FIG. 2. In embodiments wherein a plurality of refined values of the estimated X-ray scatter signal 72 are generated, the following discussion is also appropriate for refining the normalized estimated X-ray scatter signal 72 for the measured incident radiation intensity along a plurality of lines that are parallel (as shown in FIG. 2) to axis 75. The following discussion is also appropriate for refining the normalized estimated X-ray scatter signal 72 for the measured incident radiation intensity along a plurality of lines that are perpendicular (not shown in FIG. 2) to axis 75. The following discussion is also appropriate for refining the normalized estimated X-ray scatter signal 72 for the measured incident radiation intensity along a plurality of lines that are neither parallel nor perpendicular to axis 75; however, interpolation of the detector data is required for the orientation of each individual line. In one embodiment of the present invention, a linear interpolation method is utilized as the interpolation method. The use of the linear interpolation method is provided for illustration only and does not imply a limitation.

The compensator 14 of FIG. 1 is configured to iteratively generate a ("a" meaning at least one) refined value of a normalized estimated X-ray scatter signal 72 of FIG. 3 that corresponds to an uncorrected radiograph until a quality value is met.

In one specific embodiment of the present invention, iteratively generating (i.e. determining) a refined value of the normalized estimated X-ray scatter signal 72 for one profile of an uncorrected radiograph, infers that the compensator 14 is configured to: 1) subtract a normalized total X-ray signal 65 FIG. 4 of a side region 60 of an air image radiograph from the corresponding normalized total X-ray signal 65 of FIG. 3 of the side region 60 of the uncorrected radiograph to generate (i.e. calculate) a normalized side region estimated X-ray scatter signal 70; 2) generate a normalized central region estimated X-ray scatter signal 68 by interpolation between the corresponding values of the normalized side region estimated X-ray scatter signal 70 next to the respective central region 58; 3) combine the normalized side region estimated X-ray scatter signal 70 and the corresponding normalized central region estimated X-ray scatter signal 68 to generate the current value of the normalized estimated X-ray scatter signal 72; 4) low pass filter the current value of the normalized estimated X-ray scatter signal 72 to generate a low-pass filtered current value of the normalized estimated X-ray scatter signal 72; 5) refine the low-pass filtered current value of the normalized estimated X-ray scatter signal 72 by generating a three-dimensional reconstructed image to generate the refined value of the normalized estimated X-ray scatter signal 72; 6) subtract the refined value of the normalized estimated X-ray scatter signal 72 from the low-pass filtered current value of the normalized estimated X-ray scatter signal to generate a difference signal; 7) square the difference signal and sum over the entire two dimensional X-ray detector to generate a metric; 8) compare the metric against a quality value and 9) set the low-pass filtered current value of the normalized estimated X-ray scatter signal 72 to the refined value of the normalized estimated X-ray scatter signal 72 and iteratively process steps described in 5) through 9) above until the metric generated falls below the quality value.

In one embodiment of the present invention, when the uncorrected radiograph contains a plurality of profiles, the compensator 14 of FIG. 1 is further configured to perform steps 5–9 as described above until the metric generated falls below the quality value for each corresponding uncorrected radiograph. In an alternative embodiment of the present invention, the uncorrected radiograph belongs to the collection of uncorrected radiographs and each of the radiographs comprises a plurality of profiles. The compensator 14 is configured to perform steps 1–9 for each uncorrected radiograph and the compensator 14 is further configured to iteratively performs steps 5–9 as described above until the metric generated falls below the quality value for each respective uncorrected radiograph. The compensator 14 is further configured to perform the above described steps for each uncorrected radiograph in the collection of uncorrected radiographs. In the context of the present invention, the normalized X-ray signals are defined to be measured X-ray intensity data divided by an air image radiograph intensity data. In the context of the present invention, the quality value is related to achieving acceptable three-dimensional image quality. Acceptable three-dimensional image quality is based on the material composition, thickness, linear attenuation coefficient, and homogeneity of the object 20. In the context of the present invention, the side region 60 of FIG. 3 is defined to be at least one region in the profile when the object 20 of FIG. 2 does not shadow the X-ray signal 52, and the central region 58 of FIG. 3 is defined to be at least one region in the profile when the object 20 of FIG. 2 does shadow the X-ray signal 52. In the context of the present invention, the normalized side region estimated X-ray scatter signal 70 includes all regions in the profile when the object 20 of FIG. 2 does not shadow the X-ray signal 52.

The controller 900 of FIG. 1 is additionally configured to subtract the refined value of the normalized estimated X-ray scatter signal 72 of FIG. 3 from the corresponding total X-ray signal 65 of the uncorrected radiograph so as to form a corresponding corrected radiograph approximating a normalized primary X-ray signal 62. The controller 900 of FIG. 1 is typically further configured to construct an object representation from the corrected collection of radiographs. In the present invention, the term "configured to" as used herein, refers to a component, such as an electronic processor, that is constructed to receive input signals, process the signals in accordance with an algorithm, and generate described output signals. Examples of such an apparatus include digital computers with associated software, and application specific integrated circuits (ASICs).

In one embodiment of the present invention, the compensator 14 further comprises an X-ray scatter signal estimate initiator 100, a pre-processed radiograph generator 200, a volumetric reconstructed image generator 300, a thresholded image generator 400, an idealized radiograph generator 500, a noisy X-ray scatter signal generator 600, a low-pass filtered X-ray scatter signal generator 700 and an error summation generator 800. The above components may be respective modules that are configured to generate the discussed processing signals. Alternatively, the above components may be programs. These programs may be sequenced to operate on processing equipment, which provides the discussed processing signals.

An object 20 of FIG. 1 is shown situated between the X-ray source 18 and the X-ray detector 22. While the present invention will be described in terms of a system used for an inanimate object, it should be understood that the invention is applicable to any radiographic imaging system.

As part of the method of generating three-dimensional images, the X-ray source 18 and X-ray detector 22, in a fixed spatial relationship to one another, are rotationally indexed and translated around the object 20 to provide a plurality of radiographic images of the object 20. In another embodiment of the present invention, the X-ray source 18 and the X-ray detector 22 are rotationally indexed or translated around the object 20 to provide a plurality of radiographic images of the object 20. Alternatively in another embodiment of the present invention, the X-ray source 18 and X-ray detector 22 are held stationary, and the object 20 is rotationally indexed and translated, to provide the radiographic images. In another embodiment of the present invention, the X-ray source 18 and X-ray detector 22 are held stationary, and the object 20 is rotationally indexed or translated to provide the radiographic images.

In one embodiment, the controller 900 is configured, through a positioning system 1000, to control rotational indexing or translating, or both, of the object 20 relative to the combined orientation of the X-ray detector 22 and the radiographic imaging X-ray source 18. At each rotational index or translation imaging position, or both, the controller 900 activates the X-ray source 18 to irradiate the object 20. The object 20 will absorb some X-rays, resulting in attenuation of the X-ray intensity. Other X-rays pass through space without striking the object and the X-ray detector 22 detects those X-rays. During detection by the X-ray detector 22, the intensity of the impinging X-ray signal is measured by each detector element in the two-dimensional array of the X-ray detector 22. The two-dimensional radiographic information is collected at a plurality of imaging positions of the X-ray source 18 and X-ray detector 22 relative to object 20. In one embodiment of the present invention, the controller 900 is configured to turn the X-ray source 18 on and off as well as to control the X-ray detector 22 collecting each radiographic image and subsequent transmittal of each radiographic image to the data storage device 16. Additionally, the controller 900 is configured to access the data storage device 16 to send digital radiographic image information to compensator 14 and to receive the refined value of the normalized estimated X-ray scatter signal 72 from the compensator 14. Additionally, the controller 900 is configured to access the data storage device 16 to send radiographic image information to display 12. Alternatively, the controller 900 is additionally configured to access the data storage device 16 to display various images of cross sections of the imaged object. Alternatively, the controller 900 is additionally configured to access the data storage device 16 to display volumetric or surface rendered visual images. The data storage device 16 can be either physically situated in the X-ray scatter compensator 14, controller 900 or in a stand alone bulk data storage device. In one embodiment of the present invention, compensator 14 and controller 900 are situated within the same computational device. In another embodiment of the present invention, compensator 14 is situated in a separate computational device than the computational device where the controller 900 is situated. As discussed above, the controller 900 is typically further configured for forming a collection of corrected radiographs, where each of the corrected radiographs relates to a respective one of the uncorrected radiographs in the collection of the uncorrected radiographs, and for constructing an object representation from the collection of the corrected radiographs.

As the X-rays pass through the object 20 at a particular vector direction, the object's thickness and linear attenuation coefficient along that vector will modulate the strength (intensity level) of the detected X-ray intensity. Vector direction, as used herein, defines a volume of X-rays impinging on each detector element. When the X-ray detector 22 is either a one-dimensional array or a two-dimensional array, each pixel value of the X-ray detector 22 provides information about the thickness and the linear attenuation coefficient of the region of the object 20 situated along the vector connecting the X-ray source 18 and a particular X-ray detector element of the X-ray detector 22.

The two dimensional radiographic information is used in concert with a reconstruction algorithm, for example filtered back-projection, to compute the linear attenuation coefficients of three-dimensional volume elements (voxels), where a voxel data collection represents a physical three-dimensional representation of object 20. The voxel data collection representing a physical three-dimensional volume of object 20 is also stored in the data storage device 16. Upon determining a voxel value for each point in space within the object 20, the object 20 may subsequently be figuratively sliced with a plane anywhere in three-dimensional space that intersects the object 20. The controller 900 is further configured to interpolate the computed linear attenuation coefficients to generate an image of the selected "slice" of the object 20. The controller 900 is also configured to present the "selected slice" image information, as well as surface or volumetric renderings of the three-dimensional volume information, on the display 12 from the voxel data collection stored in the data storage device 16.

To enhance image quality, the radiographic image (represented by the data in the form of a two-dimensional array of pixel values measured at each position of the X-ray source 18 and the X-ray detector 22 relative to the object 20) is further processed to reduce the deleterious effects of X-ray scatter across the image.

Three radiation field components of the computed tomography imaging system of FIG. 1 are the object 20, X-ray detector 22 and X-ray source 18. A typical arrangement of these three components is provided in FIG. 2.

The computed tomography imaging system 10 of FIG. 1 can be used to determine the X-ray scatter. The X-ray source 18 (illustrated for simplicity as a point X-ray source in FIG. 2) provides the X-ray signal 52, which is directed at the object 20 (shown as a sphere in FIG. 2) in line with X-ray detector 22. The interaction of X-ray signal 52 with the object 20 results in a shadowed area 54 of FIG. 2 on area X-ray detector 22 where the object 20 attenuates some of the X-rays. An unshadowed area 56 of FIG. 2 on the X-ray detector 22 is also present, where the X-rays striking the X-ray detector are not attenuated by object 20. The unshadowed area 56 represents the entire X-ray detector 22 surface area minus the shadowed areas 54.

A depiction of the measured incident radiation intensity along an axis 75 of FIG. 2 passing through a shadowed region 54 of the X-ray detector 22 is provided in FIG. 3, where unity represents the signal strength of an unattenuated X-ray signal striking the X-ray detector. Incident X-ray intensity measurements within a central region 58 of FIG. 3 of the intensity measurement curve (i.e., the shadowed area 54 of FIG. 2) comprises the profile, which reflects the decrease in incident radiation intensity. This decrease in incident radiation intensity is a consequence of the object"s linear attenuation coefficient and X-ray path length. In side region 60 of FIG. 3, which represents the unshadowed area 56 of FIG. 2 of X-ray detector 22 outside the edges of the shadow of the object 20, the radiation passing directly from X-ray source 18 is unattenuated.

The normalized total X-ray signal 65 of FIG. 3 is the sum of two normalized X-ray signals, a normalized primary X-ray signal 62 of FIG. 3 and normalized X-ray scatter signal 64 of FIG. 3. In the absence of the object 20 in between the X-ray source 18 and the X-ray detector 22, FIG. 4 provides a depiction of the normalized total X-ray signal strength 65 along an axis 75 of FIG. 2 of the X-ray detector 22 passing through a side region 60 of FIG. 4 and an arbitrarily chosen central region 58 (no shadow region exists in the air image radiograph). Without the presence of the object 20, the normalized primary X-ray signal 62 of FIG. 4 is equal to the normalized total X-ray signal 65 of FIG. 4 due to the lack of any X-ray scattering component or attenuated X-rays in the normalized total X-ray signal 65 of FIG. 4. The normalized total X-ray signal 65 appears as a straight line across the graph as shown in FIG. 4. The straight-line unity value, where the normalized total X-ray signal 65 equals the normalized primary X-ray signal 62 across the central region 58 and side region 60 of the detector 22 of FIG. 2, is referred to as an air image radiograph. Radiographs taken when the object 20 is placed in the path of the X-ray signal 52 are expected to exhibit the same normalized primary X-ray signal 62 of FIG. 3 in the side region 60 as the normalized primary X-ray signal 62 of FIG. 4 in the air image radiograph (unattenuated radiographs).

When the object 20 of FIG. 2 is disposed in between the X-ray source 18 and the X-ray detector 22, the object 20 substantially attenuates the radiation reaching the X-ray detector 22 as depicted by the normalized total X-ray signal 65 of FIG. 3 in the central region 58. The line integral of the linear attenuation coefficient and resulting modulation of the incident X-ray intensity by the object 20 is reflected in the central region 58 of FIG. 3 of both the normalized primary X-ray signal 62 and the normalized total X-ray signal 65. The normalized total X-ray signal curve 65 in the side region 60 represents the superposition of the normalized primary X-ray signal 62 and a normalized X-ray scatter signal 64 of FIG. 3. The normalized total X-ray signal 65 of FIG. 3 is typically higher in the side region 60 than the normalized total X-ray signal 65 of FIG. 4 in the side region 60 of the air image radiograph. The difference between the normalized total X-ray signal strength 65 of FIG. 3 in the side region 60 and the normalized total X-ray signal strength 65 of FIG. 4 in the side region 60 is due to the X-ray scattering effect produced by the object 20 of FIG. 2. Radiation striking the object 20 is scattered to form a normalized X-ray scatter signal 64 of FIG. 3, which tends to be distributed across the entire X-ray detector 22 of FIG. 2.

Using the method described herein, a further and more accurate refined value of the normalized estimated X-ray scatter signal 72 of FIG. 3 is typically generated. The normalized estimated X-ray scatter signal 72 includes a normalized central region estimated X-ray scatter signal 68 and a normalized side region estimated X-ray scatter signal 70.

The normalized X-ray scatter signal 64 is not measured directly, and the refined value of the normalized estimated X-ray scatter signal 72 is iteratively calculated as generally presented above and as described in more detail as follows. The X-ray scatter signal estimate initiator 100 of FIG. 1 typically accesses the data storage device 16 via the controller 900 to retrieve both the normalized total X-ray signal 65 of FIG. 4 in the air image radiograph and the uncorrected radiograph normalized total X-ray signal 65 of FIG. 3. The assumption that the normalized central region estimated X-ray scatter signal 68 is generated by interpolation between the values of the normalized side region estimated X-ray scatter signal 70 next to the central region 58 of the X-ray detector 22 of FIG. 2 is but an informed assumption. The steps to improve upon the current value of the normalized estimated X-ray scatter signal 72 of FIG. 3 are described below. The X-ray scatter signal estimate initiator 100 then low pass filters the current value of the normalized estimated X-ray scatter signal 72 to generate a low-pass filtered current value of the normalized estimated X-ray scatter signal 72. The X-ray scatter signal estimate initiator 100 then outputs the low-pass filtered current value of the normalized estimated X-ray scatter signal 72 to the pre-processed radiograph generator 200 of FIG. 1 and to the error summation generator 800.

In one embodiment of the present invention, the pre-processed radiograph generator 200 subtracts the low-pass filtered current value of the normalized estimated X-ray scatter signal 72 of FIG. 3 due to the object 20 of FIG. 1 from the normalized total X-ray signal 65 of FIG. 3 of each of the corresponding uncorrected radiographs to generate a collection of pre-processed two-dimensional corrected radiographs. Each of the pre-processed two-dimensional radiographs, in the collection of pre-processed two-dimensional corrected radiographs, has a corresponding estimate of the normalized primary X-ray signal 62, which is presented in FIG. 3. The pre-processed radiograph generator 200 of FIG. 1 accesses the data storage device 16 of FIG. 1 via the controller 900 to retrieve the normalized total X-ray signal data 65 of FIG. 3 of the uncorrected radiograph.

If the subtraction process results in a calculated estimate of the normalized primary X-ray signal 62 of FIG. 3 that has very small or negative intensity values within the central region 58, then the low-pass filtered current value of the normalized estimated X-ray scatter signal 72 is scaled by a number less than 1. In the case where the low-pass filtered current value of the normalized estimated X-ray scatter signal 72 is scaled by a number less than 1, the scaled low-pass filtered current value of the normalized estimated X-ray scatter signal 72 is subsequently subtracted from the normalized total X-ray signal curve 65 of the uncorrected radiograph to generate the corresponding pre-processed radiograph.

The pre-processed radiograph generator 200 of FIG. 1 typically outputs the collection of the pre-processed two-dimensional radiographs to the volumetric reconstructed image generator 300 of FIG. 1.

The volumetric reconstructed image generator 300 of FIG. 1 typically processes the collection of the two-dimensional pre-processed radiographs to generate a three-dimensional reconstructed image of the object 20 utilizing a reconstruction algorithm, possibly a filtered back-projection algorithm or any other applicable reconstruction algorithm. The volumetric reconstructed image generator 300 of FIG. 1 outputs the three-dimensional reconstructed image to the thresholded image generator 400 of FIG. 1.

The thresholded image generator 400 typically generates a three-dimensional thresholded image by thresholding the three-dimensional reconstructed image. Thresholding the three-dimensional reconstructed image is accomplished by comparing each of corresponding three-dimensional reconstructed image pixel values with a threshold value. A homogeneous object"s material, associated linear attenuation coefficient (LAC), and X-ray source 18 energy level combine to determine an appropriate threshold value.

Each of the three-dimensional reconstructed image pixel values is replaced with the threshold value if a three-dimensional reconstructed image pixel value exceeds the threshold value. Each of the three-dimensional reconstructed image pixel values is replaced with zero if the three-dimensional reconstructed image pixel value is below the threshold value. A three-dimensional thresholded image is then generated that includes a plurality of pixels where the pixel value is either the threshold value or zero. The thresholded image generator 400 of FIG. 1 outputs the three-dimensional thresholded image to the idealized radiograph generator 500 of FIG. 1.

The idealized radiograph generator 500 typically generates a collection of idealized two-dimensional radiographs which are digital radiographic estimates of the radiographic images that would be produced if the three-dimensional reconstructed image was an exact representation (i.e., idealized image) of the object 20, by forward projecting the three-dimensional thresholded image. The forward projection process typically includes simulating the three-dimensional geometry of the imaging system 10 comprising, a simulated X-ray detector, a simulated X-ray beam and the three-dimensional thresholded image, where the simulated X-ray beam further comprises a plurality of simulated X-rays intersecting the three-dimensional thresholded image. The path length of the simulated X-ray is determined by using the three-dimensional thresholded image, where the simulated X-ray is extended from the simulated X-ray source to each detector element in an array of simulated detector elements in the simulated X-ray detector. The path length is computed, for each of the simulated X-rays that intersects the representation of object 20 in the three-dimensional thresholded image, from where the simulated X-ray enters the representation of the object 20 to where the simulated X-ray exits the representation of the object 20. A sufficient number of simulated X-rays are used to properly sample the primary X-ray signal across the simulated X-ray detector. In one embodiment of the present invention, the simulated X-ray detector is a two-dimensional X-ray detector. By properly calculating the line integral of the linear attenuation coefficient for each simulated X-ray in the simulated X-ray beam, the simulated intensity signal value for each detector element of interest in the simulated X-ray detector may be computed for each two-dimensional idealized radiograph. Using the path length of the simulated X-ray and the LAC value, the normalized intensity signal in the simulated X-ray detector is calculated by taking the exponential of the negative product of the path length (L) of each of corresponding simulated X-rays and the LAC value (i.e. normalized intensity signal=$e^{-L*AC}$). By performing this operation, each of the estimates of the normalized primary X-ray signal 62 of FIG. 3 and each of the corresponding two-dimensional idealized radiographs are calculated. The idealized radiograph generator 500 of FIG. 1 outputs each of the two-dimensional idealized radiographs, i.e. a collection of idealized radiographs to the noisy X-ray scatter signal generator 600 of FIG. 1.

The noisy X-ray scatter signal generator 600 typically subtracts each one of the two-dimensional idealized radiographs from the corresponding normalized total X-ray signal 65 of FIG. 3 of the respective ones of the uncorrected radiographs for each one of the respective radiographic image positions to generate a collection of two-dimensional maps, which are noisy representations of the normalized estimated X-ray scatter signal 72 for each of the corresponding radiographic image positions. The noisy X-ray scatter signal generator 600 of FIG. 1 accesses the data storage device 16 of FIG. 1 via the controller 900 to retrieve the corresponding normalized total X-ray signal for each of the respective ones of the uncorrected radiographs for each of the respective radiographic image positions.

The collection of two-dimensional idealized radiographs generated is designed to appropriately sample the temporal changes in the actual normalized X-ray scatter signal 64 due to relative motion of the object 20 with respect to the position of the X-ray source 18 and X-ray detector 22. The X-ray scatter signal typically changes slowly from the radiographic image acquired at one position of the X-ray source 18 and the X-ray detector 22 relative to the object 20 compared to the subsequent acquisition. In addition, the actual normalized X-ray scatter signal 64 typically changes very slowly spatially across the X-ray detector, i.e. with no abrupt signal truncation. The noisy X-ray scatter signal generator 600 of FIG. 1 outputs the noisy representation of the normalized estimated X-ray scatter signal 72 to the low pass filtered X-ray scatter signal generator 700 of FIG. 1.

The low-pass filtered X-ray scatter signal generator 700 of FIG. 1 typically generates each refined value of the normalized estimated X-ray scatter signal 72 of FIG. 3 by low-pass filtering the corresponding noisy representation of the normalized estimated X-ray scatter signal 72, which further increases the quality of the normalized estimated X-ray scatter signal 72. This step removes any remaining high-frequency components in the noisy representations of the normalized estimated X-ray scatter signal 72. The low-pass filtered X-ray scatter signal generator 700 of FIG. 1 outputs each refined value of the normalized estimated X-ray scatter signal 72 to the error summation generator 800 of FIG. 1.

The error summation generator 800 of FIG. 1 typically subtracts the refined value of the normalized estimated X-ray scatter signal 72 of FIG. 3 from each respective low-pass filtered current value of the normalized estimated X-ray scatter signal 72 to generate a corresponding difference signal. A metric that indicates the benefit that was obtained in calculating the refined value of the normalized estimated X-ray scatter signal 72 is computed by squaring the difference signal to create a squared difference signal and summing the squared difference signal over the entire two-dimensional X-ray detector 22 of FIG. 1. The error summation generator 800 compares the metric to a quality value. The error summation generator 800 also sets the low-pass filtered current value of the normalized estimated X-ray scatter signal 72 of FIG. 3 to the refined value of the normalized estimated X-ray scatter signal 72. The process to improve the low-pass filtered current value of the normalized estimated X-ray scatter signal 72 of the corresponding ones of the uncorrected radiographs continues iteratively until the metric generated falls below the quality value for each one of the uncorrected radiographs. When the metric falls below the quality value, that indicates that the refined value of the normalized estimated X-ray scatter signal 72 is not varying significantly compared to the low-pass filtered current value of the normalized estimated X-ray scatter signal 72 and the method may be terminated. When the metric falls below the quality value, the metric also indicates that both the refined value of the normalized estimated X-ray scatter signal 72 and the low-pass filtered current value of the normalized estimated X-ray scatter signal 72 generated are very similar, and that the refined value of the normalized estimated X-ray scatter signal 72 could not be appreciably improved. The error summation generator 800 of FIG. 1 accesses the data storage device 16 via the controller 900 to store the refined value of the normalized estimated X-ray scatter signal 72 of FIG. 3 and to set the low-pass filtered current value of the normalized estimated X-ray scatter signal 72 to the refined value of the normalized estimated X-ray scatter signal 72. The entire collection of the uncorrected radiographs is processed to generate respective corrected radiographs as described above to generate the corresponding acceptable three-dimensional image quality.

This method provides an improvement in the signal-to-noise ratio (SNR) of the three-dimensional reconstructed image (assuming that scatter is an X-ray source of noise). The improvement in SNR results in improved image quality and resolution.

The forward projection routine that generates each one of the two-dimensional idealized radiographs corresponding to a particular radiographic image position from the three-dimensional thresholded image is computationally intensive. The forward projection routine generates a two-dimensional idealized radiograph for each position of the X-ray source 18 of FIG. 2 and the X-ray detector 22 relative to the object 20. To compute each one of the two-dimensional idealized radiographs, simulated X-rays are emitted from a simulated X-ray source towards a particular X-ray detector element and their interaction with the representation of the object 20 in the three-dimensional thresholded image is determined for each particular X-ray detector element. Using known characteristics of the X-ray scatter signal 64 of FIG. 3, it is possible to reduce the computational load of the forward projection routine.

The collection of two-dimensional idealized radiographs computed in the forward projection routine is used to generate noisy representations of the normalized estimated X-ray scatter signal 72 within the X-ray detector. Since the normalized X-ray scatter signal 64 is inherently a low-frequency signal, it is not necessary to estimate the value of the normalized estimated X-ray scatter signal 72 at every X-ray detector element location in the X-ray detector. For instance, in one embodiment of the present invention, the noisy representation of the normalized estimated X-ray scatter signal 72 was calculated at every other X-ray detector element (sub-sampling factor equal to 2). Alternatively, the noisy representation of the normalized estimated X-ray scatter signal 72 was calculated at every third X-ray detector element (sub-sampling factor equal to 3). Since a two-dimensional X-ray detector 22 of FIG. 2 is used for data acquisition, setting the sub-sampling factor to a value greater than or equal to 1 typically reduces the computational load by the square of the sub-sampling factor. Using a priori knowledge about the frequency content of the normalized X-ray scatter signal 64 of FIG. 3, an appropriate sub-sampling factor is chosen considering the nature of the object 20 of FIG. 2 and previous experience with the resulting value of the normalized estimated X-ray scatter signal 72 of FIG. 3 to significantly reduce the computational load of the forward projection routine. The actual determination of the appropriate sub-sampling factor is based on knowledge of the irradiated object 20 of FIG. 2 and is left to the artisan. The sub-sampling factor utilized in the direction parallel to axis 75 is not necessarily the same as the sub-sampling factor utilized in the direction perpendicular to axis 75. The normalized estimated X-ray scatter signal 72 of FIG. 3 is generated across the entire X-ray detector 22 of FIG. 2 by interpolation, when a sub-sampling factor is employed.

Initially subtracting the normalized total X-ray signal 65 of FIG. 4 of the side region 60 of an air image radiograph from the corresponding normalized total X-ray signal 65 of FIG. 3 of the side region 60 of the uncorrected radiograph generates the current value of the normalized side region estimated X-ray scatter signal 70, which reduces the computational load of the method.

Initially generating the normalized central region estimated X-ray scatter signal 68 of FIG. 3 by interpolation between values of the corresponding normalized side region estimated X-ray scatter signal 70 next to the respective central region 58, reduces the computational load of the method. Initially estimating the normalized central region estimated X-ray scatter signal 68, the normalized side region estimated X-ray scatter signal 70 and combining the normalized central region and normalized side region estimated X-ray scatter signals 68 and 70, respectively, to generate the current value of the normalized estimated X-ray scatter signal 72, and low-pass filtering the current value of the normalized estimated X-ray scatter signal 72 to generate the low-pass filtered current value of the normalized estimated X-ray scatter signal 72 prior to the first iteration of the method is performed as described above.

It is also possible to consider less than every view or radiographic image position of the object 20 as a further method to reduce the computational load of the method. However generating a collection of sub-sampled views, using less than every view of the object 20, depends upon the total number of views available of the object 20 and the nature of the object 20 itself. A typical sub-sampling factor range of between about 2 and about 10 is possible depending upon the total number of views available of the object 20 and the nature of the object 20 itself. A two-dimensional normalized estimated X-ray scatter signal 72 for each missing view is then generated by interpolation utilizing the collection of sub-sampled views.

A specific embodiment of a method and an apparatus for processing a collection of radiographs, including estimating and subsequently subtracting the normalized estimated X-ray scatter signal 72 from a collection of radiographs, to form a corrected collection of radiographs used to construct an object representation in the radiographic imaging system according to the present invention has been described for the purpose of illustrating the manner in which the invention is made and used.

The foregoing description of several embodiments of the present invention has been presented for purposes of illustration. Although the invention has been described and illustrated in detail, it is to be clearly understood that the same is intended by way of illustration and example only and is not to be taken by way of limitation. Obviously many modifications and variations of the present invention are possible in light of the above teaching. Accordingly, the spirit and scope of the present invention are to be limited only by the terms of the appended claims.

What is claimed is:

1. An apparatus for processing an uncorrected radiograph comprising:
   an X-ray scatter compensator; and
   a controller coupled to said compensator,
   wherein said compensator is configured for iteratively generating a refined value of a normalized estimated X-ray scatter signal corresponding to an uncorrected radiograph,
   wherein said controller is configured for subtracting said refined value from a corresponding normalized total X-ray signal of said uncorrected radiograph so as to form a corresponding corrected radiograph.

2. The apparatus of claim 1, wherein said uncorrected radiograph has a plurality of profiles and each of said profiles has a corresponding normalized total X-ray signal, wherein said compensator is further configured for iteratively generating a plurality of refined values, wherein said controller is further configured to subtract each of said refined values from a respective one of said plurality of normalized total X-ray signals so as to form said corresponding corrected radiograph.

3. An apparatus for processing a collection of uncorrected radiographs comprising:
   an X-ray scatter compensator; and
   a controller coupled to said compensator, wherein said compensator is configured for iteratively generating a plurality of refined values, each corresponding to a profile of a corresponding one of said uncorrected radiographs,
   wherein said controller is configured to subtract each of said refined values from a normalized total X-ray signal corresponding to said profile of said corresponding one of said uncorrected radiographs so as to form a collection of corrected radiographs.

4. The apparatus of claim 3, wherein said controller is further configured for constructing an object representation from said collection of corrected radiographs.

5. The apparatus of claim 3, wherein said compensator is further configured to generate at least one of said refined values by:
   subtracting a normalized total X-ray signal of a side region of an air image radiograph from a corresponding normalized total X-ray signal of said side region of said uncorrected radiograph to generate a normalized side region estimated X-ray scatter signal;
   generating a normalized central region estimated X-ray scatter signal by interpolation between corresponding values of said normalized side region estimated X-ray scatter signal next to said respective central region;
   combining said normalized side region estimated X-ray scatter signal and said corresponding normalized central region estimated X-ray scatter signal to generate a current value of said normalized estimated X-ray scatter signal; and
   low pass filtering said current value of said normalized estimated X-ray scatter signal to generate a low-pass filtered current value of said normalized estimated X-ray scatter signal.

6. The apparatus of claim 5, wherein said compensator is further configured to generate a collection of pre-processed radiographs by, for each respective one of said uncorrected radiographs, subtracting said low-pass filtered current value of said normalized estimated X-ray scatter signal from said normalized total X-ray signal.

7. The apparatus of claim 6, wherein said compensator is further configured to generate each of said refined values by processing said collection of pre-processed radiographs with a reconstruction algorithm to produce a three-dimensional reconstructed image.

8. The apparatus of claim 7, wherein said compensator is further configured to generate said refined values by generating a three-dimensional thresholded image by comparing a three-dimensional reconstructed image pixel value with threshold value, wherein said three-dimensional reconstructed image pixel value is replaced with said threshold value if said three-dimensional reconstructed image pixel value exceeds said threshold value, and said three-dimensional reconstructed image pixel value is replaced with zero if said three-dimensional reconstructed image pixel value is below said threshold value.

9. The apparatus as in claim 8, wherein said compensator is further configured to generate each of said refined values by forward projecting said three-dimensional thresholded image to generate a collection of idealized radiographs.

10. The apparatus of claim 9, wherein the compensator is further configured to generate each of said refined values by:
    simulating a corresponding three-dimensional geometry of an imaging system comprising, a simulated X-ray detector, a simulated X-ray beam and said three-dimensional thresholded image, wherein said simulated X-ray beam further comprises a plurality of simulated X-rays intersecting a representation of said object in said three-dimensional thresholded image, wherein said corresponding simulated X-rays that intersect said representation of said object extend from said simulated X-ray source to said simulated X-ray detector element in an array of said simulated X-ray detector elements in said simulated X-ray detector;
    computing a path length for each of said corresponding simulated X-rays that intersects said representation of said object, wherein said path length extends from where said simulated X-ray enters said representation of said object to where said simulated X-ray exits said representation of said object;
    calculating a normalized intensity signal by taking an exponential of the negative product of each of said path lengths through said three-dimensional thresholded image for each of corresponding said simulated X-rays and said respective linear attenuation coefficient; and
    calculating each of said estimates of said normalized primary X-ray signal for each of said corresponding idealized radiographs.

11. The apparatus of claim 9, wherein said compensator is further configured to generate each of said refined values by subtracting each idealized radiograph of said collection of idealized radiographs from said corresponding normalized total X-ray signal of said respective one of said uncorrected radiographs to generate a collection of noisy representations of said normalized estimated X-ray scatter signal.

12. The apparatus of claim 11, wherein said compensator is further configured to generate each of said refined values by low-pass filtering said noisy representations of said normalized estimated X-ray scatter signal.

13. The apparatus of claim 12, wherein said compensator is further configured to generate each of said refined values by:

subtracting said refined value of said normalized estimated X-ray scatter signal from said low-pass filtered current value of said normalized estimated X-ray scatter signal to compute a difference signal;

squaring said difference signal to create a squared difference signal; suming said squared difference signal over an array of detector elements in an X-ray detector to create a metric;

comparing said metric against a quality value;

setting said low-pass filtered current value of said normalized estimated X-ray scatter signal equal to said refined value of said normalized estimated X-ray scatter signal; and iteratively generating said refined value of said normalized estimated X-ray scatter signal of said corresponding ones of said uncorrected radiographs until said metric falls below said quality value for each of said uncorrected radiographs in said collection of uncorrected radiographs.

14. The apparatus of claim 3, wherein said compensator is further configured for iteratively generating each of said refined values corresponding for said profile in each uncorrected radiograph in a collection of uncorrected radiographs, wherein said controller is further configured to subtract said refined value from said corresponding normalized total X-ray signal of said profile in each of said uncorrected radiographs so as to form a collection of corrected radiographs.

15. The apparatus of claim 14, wherein said controller is further configured for constructing an object representation from said collection of corrected radiographs.

16. An apparatus for determining a refined value of a normalized estimated X-ray scatter signal for each corresponding uncorrected radiograph of a collection of uncorrected radiographs, produced by placing an object between an X-ray detector and an X-ray source, wherein said X-ray source generates an X-ray signal comprising:

an X-ray scatter compensator, said compensator further comprising;

(a) an X-ray scatter signal estimate initiator configured for:

subtracting a normalized total X-ray signal of a side region of an air image radiograph from a corresponding normalized total X-ray signal of said side region of said corresponding uncorrected radiograph to calculate a normalized side region estimated X-ray scatter signal;

generating a normalized central region estimated X-ray scatter signal by interpolation between corresponding values of said normalized side region estimated X-ray scatter signal next to said respective central region;

combining said normalized side region estimated X-ray scatter signal and said corresponding normalized central region estimated X-ray scatter signal to generate a current value of said normalized estimated X-ray scatter signal;

low pass filtering said current value of said normalized estimated X-ray scatter signal to generate a low-pass filtered current value of said normalized estimated X-ray scatter signal;

(b) a pre-processed radiograph generator configured to generate a collection of pre-processed radiographs by, for each respective one of said uncorrected radiographs, subtracting said low-pass filtered current value of said normalized estimated X-ray scatter signal from said normalized total X-ray signal;

(c) a volumetric reconstructed image generator configured for producing a three-dimensional reconstructed image of said object from said collection of pre-processed radiographs utilizing a reconstruction algorithm;

(d) a thresholded image generator configured for thresholding said three-dimensional reconstructed image to generate a corresponding three-dimensional thresholded image;

(e) an idealized radiograph generator configured for forward projecting said three-dimensional thresholded image to generate a collection of idealized radiographs;

(f) a noisy X-ray scatter signal generator configured for subtracting each one of said idealized radiographs from said corresponding normalized total X-ray signal of said respective ones of said uncorrected radiographs to generate a collection of noisy representations of said normalized estimated X-ray scatter signal;

(g) a low-pass filtered X-ray scatter generator configured for removing high frequency signal components from each of said noisy representations of said corresponding normalized estimated X-ray scatter signal to generate said refined value of said normalized estimated X-ray scatter signal for each of said uncorrected radiographs; and (h) an error summation generator configured for:

subtracting said refined value of said normalized estimated X-ray scatter signal of each of said corresponding uncorrected radiographs from said low-pass filtered current value of said corresponding normalized estimated X-ray scatter signal to compute a difference signal;

squaring said difference signal to create a squared difference signal; summing said squared difference signal over an array of detector elements of said X-ray detector to create a metric;

comparing said metric against a quality value; and setting said low-pass filtered current value of said normalized estimated X-ray scatter signal equal to said refined value of said normalized estimated X-ray scatter signal, (i) said compensator further configured for iteratively processing paragraph (b) through paragraph (h) to generate said refined value of said normalized estimated X-ray scatter signal of said corresponding ones of said uncorrected radiographs until said metric falls below said quality value for each of said uncorrected radiographs in said collection of uncorrected radiographs.

17. The apparatus of claim 16, wherein said thresholded image generator is configured for:

comparing each of corresponding three-dimensional reconstructed image pixel values with a threshold value;

replacing each of said three-dimensional reconstructed image pixel values with said threshold value if said three-dimensional reconstructed image pixel value exceeds said threshold value;

replacing each of said three-dimensional reconstructed image pixel values with zero if said three-dimensional reconstructed image pixel value is below said threshold value; and producing said three-dimensional thresholded image.

18. The apparatus of claim 16, wherein said idealized radiograph generator is configured for forward projecting said three-dimensional thresholded image, wherein said idealized radiograph generator is also configured for:

simulating a corresponding three-dimensional geometry of an imaging system comprising, a simulated X-ray detector, a simulated X-ray beam and said three-dimensional thresholded image, wherein said simulated X-ray beam further comprises a plurality of simulated X-rays intersecting a representation of said object in said three-dimensional thresholded image, wherein said corresponding simulated X-rays that intersect said representation of said object extend from said simulated X-ray source to said simulated X-ray detector element in an array of said simulated X-ray detector elements in said simulated X-ray detector;

computing a path length for each of said corresponding simulated X-rays that intersects said representation of said object, wherein said path length extends from where said simulated X-ray enters said representation of said object to where said simulated X-ray exits said representation of said object;

calculating a normalized intensity signal by taking an exponential of the negative product of each of said path lengths through said three-dimensional thresholded image for each of corresponding said simulated X-rays and said respective linear attenuation coefficient; and calculating each of said estimates of said normalized primary X-ray signal for each of said corresponding idealized radiographs.

19. The apparatus of claim 18, wherein said idealized radiograph generator is configured for forward projecting said three-dimensional thresholded image to generate a plurality of said idealized radiographs at less than every said X-ray detector element.

20. The apparatus of claim 19, wherein said idealized radiograph generator is configured for forward projecting said three-dimensional thresholded image to generate said collection of idealized radiographs at every other said X-ray detector element.

21. The apparatus of claim 19, wherein said idealized radiograph generator is configured for forward projecting said three-dimensional thresholded image to generate said collection of idealized radiographs at every third said X-ray detector element.

22. The apparatus of claim 18, wherein said idealized radiograph generator is configured for forward projecting said three-dimensional thresholded image to generate said collection of idealized radiographs at less than every view of said object.

23. The apparatus of claim 22, wherein said idealized radiograph generator is configured for forward projecting said three-dimensional thresholded image to generate said collection of idealized radiographs at every other view of said object.

24. The apparatus of claim 22, wherein said idealized radiograph generator is configured for forward projecting said three-dimensional thresholded image to generate said collection of idealized radiographs at every third view of said object.

25. A method for processing an uncorrected radiograph comprising:

iteratively generating a refined value of a normalized estimated X-ray scatter signal corresponding to an uncorrected radiograph; and subtracting said refined value of said normalized estimated X-ray scatter signal from a corresponding normalized total X-ray signal of a respective one of said uncorrected radiographs so as to form a corresponding corrected radiograph.

26. The method of claim 25, wherein said uncorrected radiograph has a plurality of profiles and each of said profiles has a corresponding normalized total X-ray signal, further comprising;

iteratively generating a plurality of refined values, wherein each of said refined values corresponds to a respective portion of said uncorrected radiograph; and subtracting each of said refined values from a respective one of said plurality of normalized total X-ray signals so as to form said corresponding corrected radiograph.

27. A method for processing a collection of undercorrected radiographs comprises:

iteratively generating a refined value of a normalized estimated X-ray scatter signal corresponding to each profile of uncorrected radiographs in each of said collection of uncorrected radiographs;

subtracting each of said refined values from a corresponding normalized total X-ray signal for each profile in each of said uncorrected radiographs so as to form a collection of corrected radiographs; and constructing an object representation from said collection of corrected radiographs.

28. A method for generating a refined value of a normalized estimated X-ray scatter signal in three-dimensional reconstructed images comprises:

(a) subtracting a normalized total X-ray signal of a side region of an air image radiograph from said corresponding normalized total X-ray signal of said side region of an uncorrected radiograph, in a collection of uncorrected radiographs, produced by irradiating an object to generate a normalized side region estimated X-ray scatter signal;

generating a normalized central region estimated X-ray scatter signal by interpolation between corresponding values of said normalized side region estimated X-ray scatter signal next to said respective central region;

combining said normalized side region estimated X-ray scatter signal and corresponding said normalized central region estimated X-ray scatter signal to generate a current value of said normalized estimated X-ray scatter signal;

low pass filtering said current value of said normalized estimated X-ray scatter signal to generate a low-pass filtered current value of said normalized estimated X-ray scatter signal;

(b) subtracting said low-pass filtered current value of said normalized estimated X-ray scatter signal from said normalized total X-ray signal of respective ones of said collection of uncorrected radiographs and generating a collection of preprocessed radiographs;

(c) generating a three-dimensional reconstructed image from said collection of pre-processed radiographs using a reconstruction algorithm;

(d) thresholding said three-dimensional reconstructed image utilizing a threshold value to produce a three-dimensional thresholded image;

(e) forward projecting said three-dimensional thresholded image to generate a collection of idealized radiographs;

(f) calculating a collection of noisy representations of said normalized estimated X-ray scatter signal by subtracting each one of said idealized radiographs from said corresponding normalized total X-ray signal of said respective ones of said uncorrected radiographs;

(g) low pass filtering said noisy representation of said normalized estimated X-ray scatter signal to produce said refined value of said normalized estimated X-ray scatter signal for each of said uncorrected radiographs;

(h) subtracting said refined value of said normalized estimated X-ray scatter signal of each of said corresponding uncorrected radiographs from said low-pass filtered current value of said normalized estimated X-ray scatter signal to compute a difference signal;

(i) squaring said difference signal to create a squared difference signal and summing said squared difference signal over an array of detector elements in an X-ray detector to create a metric;

(j) comparing said metric against a quality value, and setting said low-pass filtered current value of said normalized estimated X-ray scatter signal to said refined value of said normalized estimated X-ray scatter signal; and (k) repeating step b through step j to generate said refined value of said normalized estimated X-ray scatter signal of said corresponding ones of said uncorrected radiographs, until said metric falls below said quality value for each of said uncorrected radiographs of said collection of uncorrected radiographs.

29. The method of claim 28, wherein said step of thresholding said three-dimensional reconstructed image to generate said thresholded three-dimensional image is accomplished by comparing each three-dimensional reconstructed image pixel value with a threshold value, where said three-dimensional reconstructed image pixel value is replaced with said threshold value if said three-dimensional reconstructed image pixel value exceeds said threshold value, and said three-dimensional reconstructed image pixel value is replaced with zero if said three-dimensional reconstructed image pixel value is below said threshold value.

30. The method of claim 28, wherein said step of forward projecting said thresholded image to produce each of said idealized radiographs further comprises:

simulating a corresponding three-dimensional geometry of an imaging system comprising a simulated X-ray detector, a simulated X-ray beam and said three-dimensional thresholded image, wherein said simulated X-ray beam further comprises a plurality of simulated X-rays intersecting a representation of said object in said three-dimensional thresholded image, wherein said corresponding simulated X-rays that intersect said representation of said object extend from said simulated X-ray source to said simulated X-ray detector element in an array of said simulated X-ray detector elements in said simulated X-ray detector;

computing a path length for each of said corresponding simulated X-rays that intersects said representation of said object, wherein said path length extends from where said simulated X-ray enters said representation of said object to where said simulated X-ray exits said representation of said object for each of said idealized radiographs;

calculating a normalized intensity signal by taking an exponential of the negative product of each of said path lengths through said three-dimensional thresholded image for each of corresponding said simulated X-rays and said respective linear attenuation coefficient; and calculating each of said estimates of said normalized primary X-ray signal for each of said corresponding idealized radiographs.

31. The method of claim 30, wherein said step of generating idealized radiographs is performed at less than every said X-ray detector element.

32. The method of claim 30, wherein said step of generating idealized radiographs is performed at every other said X-ray detector element.

33. The method of claim 30, wherein said step of generating idealized radiographs is performed at every third said X-ray detector element.

34. The method of claim 30, wherein said step of generating idealized radiographs is performed at less than every view of said object.

35. The method of claim 30, wherein said step of generating idealized radiographs is performed at every other view of said object.

36. The method of claim 30, wherein said step of generating idealized radiographs is performed at every third view of said object.

* * * * *